H. P. JORDAN.

Improvement in Sulky-Cultivator and Horse-Hoe.

No. 125,961. Patented April 23, 1872.

125,961

UNITED STATES PATENT OFFICE.

HUGH PAXTON JORDAN, OF VICTORIA, TEXAS.

IMPROVEMENT IN CULTIVATORS.

Specification forming part of Letters Patent No. 125,961, dated April 23, 1872.

*To all whom it may concern:*

Be it known that I, HUGH P. JORDAN, of Victoria, in the county of Victoria and State of Texas, have invented a new and useful Improvement in Sulky-Cultivator and Horse-Hoe; and I do hereby declare that the following is a full, clear, and exact description thereof, which will enable others skilled in the art to make and use the same, reference being had to the accompanying drawing forming part of this specification, in which—

Figure 1:
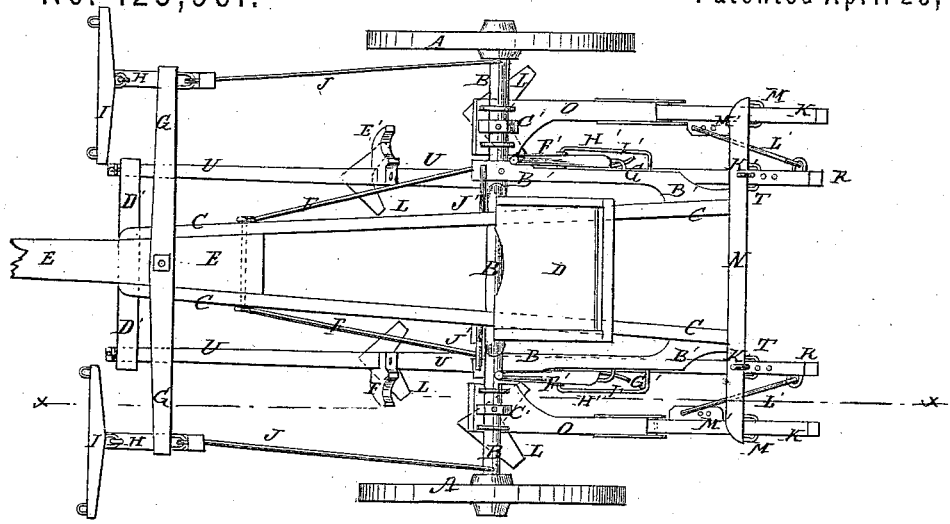
Figure 2:
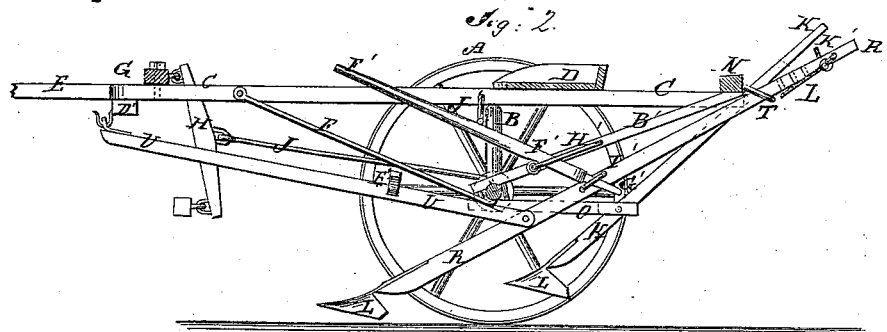
Figure 3:
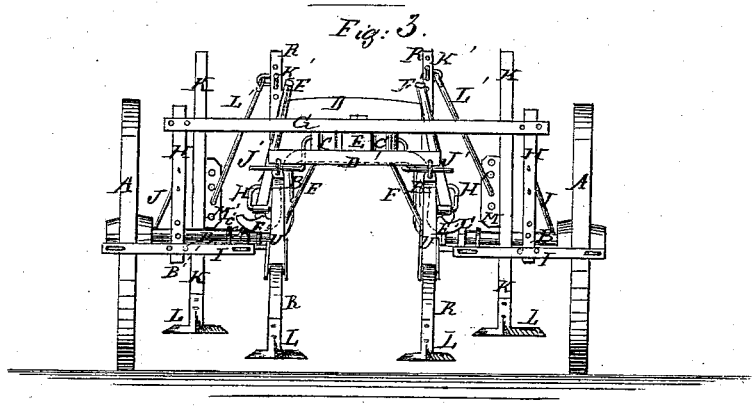

Figure 1 is a top view of my improved machine. Fig. 2 is a vertical longitudinal section of the same taken through the line $x\ x$, Fig. 1. Fig. 3 is a front view of the same.

Similar letters of reference indicate corresponding parts.

My invention has for its object to improve the construction of my improved sulky-cultivator, patented January 10, 1871, and numbered 110,853, so as to make it more convenient in use, and more effective in operation; and it consists in the construction and combination of various parts of the machine, as hereinafter more fully described.

A are the sulky-wheels, which revolve upon and are secured to the journals of the axles B in the ordinary manner. The middle part of the axle B is bent four times at right angles, to form a space or offset, to allow the cultivator to be used for cultivating tall plants without breaking or injuring them. To the upper part or bend of the axle are attached the middle parts of two bars, C, to which, a little in the rear of the axle B, is attached the driver's seat D, and to and between the forward ends of which is rigidly attached the rear end of the tongue E. The forward ends of the bars C are sustained against the draft strain and against the lateral strain in turning by the two brace-rods F, one upon each side, the forward ends of which are attached to the forward parts of the said bars C, and the rear ends of which are attached to the lower horizontal parts of the axle B, near the inner ends of said horizontal parts. The rear ends of the bars C are sustained in position by the braces B', the rear ends of which are attached to the rear ends of the bars C, and their forward ends are attached to the lower horizontal parts of the axle B, near the inner ends of said horizontal parts. G is a double-tree, which is pivoted to the rear part of the tongue E. H are the draft-bars, the upper ends of which are pivoted to the rear side of the ends of the double-tree G by eye-bolts or staples, as shown in Figs. 1 and 2; and to their lower ends are attached the whiffletrees I by eye-bolts, hook-bolts, or staples, as shown in Figs. 1 and 2, several holes being formed in the lower parts of the draft-bars H to receive the said eye-bolt, hook-bolt, or staple, so that the points of draft-attachment may be conveniently raised and lowered, as required, enabling the line of draft to be so regulated as to relieve the necks of the horses from any downward pressure from the tongue. To the middle parts of the draft-bars H are attached the forward ends of the draft-rods J, the rear ends of which are attached to the lower horizontal parts of the axle B, near the inner ends of the hubs of the wheels A. K are the outer plow-standards, to the lower ends of which are attached plows L, and the upper ends of which pass up through keepers M, attached to the end parts of the cross-bar N, attached to the rear ends of the bars C. The draft-strain upon the standards K is sustained by the draft-bars O, the rear ends of which are pivoted to the middle parts of the said standards, and the forward ends of which are connected with and pivoted to the lower horizontal parts of the axle B, as shown in Figs. 1, 2, and 3, by straps, bands, or clips passing around said axle and attached to said bars. C' are bands, passing around the axle B, and entering grooves in, or being attached to the forward ends of the bars O. The bands C' are secured in place by set-screws, so that, by loosening the said set-screws the ends of the bars O may be moved outward or inward upon the axle B to adjust the outer plow-standards as may be required. R are the inner plow-standards, to the lower ends of which are attached the plows L, and the upper ends of which pass up through staples or keepers T, attached to the cross-bar N. The draft-strain upon the plow-standards R is sustained by the draft-bars U, the rear ends of which are pivoted to the lower parts of the said standards R, and the forward ends of which are pivoted to the ends of a short cross-bar, D', which is rigidly attached to the forward ends of the bars C. To the middle parts of the draft-bars U are attached foot-rests, E', so that the inner plows may be conveniently guided by the driver with his feet. The foot-rests E' may be adjustably attached to the draft-bars U, so that they may be moved forward or back, as the convenience of the driver may require. F' are detached levers, which have plates, G', attached to their rear or lower ends, which adapt said levers to be used for cleaning the plows from any soil that may adhere to them. The levers F' G' are passed through long keepers H', attached to the brace-bars B', and which serve as fulcrums to the said levers. The lower arms of the keepers H' may have friction rollers placed upon them, to diminish the friction as the levers F' G' are operated. The rear or lower ends of the levers F' G' are inserted in keepers I', which are swiveled to the sides of the inner plow-standards R, so that the said levers may be moved freely.

By this construction, the inner plows are guided by moving the forward ends of the levers F' G' laterally. This construction also allows the forward ends of the levers F' G' to be raised, as required, in guiding the horses, so that the driver can drive his horses, and at the same time hold the levers F' G' ready to guide the plows. By moving the forward ends of the levers F' G' downward, the inner plow-standards R will be raised from the ground, in which position they may be held for turning, or passing from place to place, by catching the forward parts of said levers upon the catches J' attached to the bars C. The depth at which the plows L, attached to the inner standards R, work in the ground, is regulated by pins K', which pass through holes in the said standards and rest upon the cross-bar N, several holes being formed in the said standards to receive the said pins, so that the said standards may be adjusted as required.

To the standards R, at or near their upper ends, are pivoted the upper ends of the rods L', which have hooks formed upon their lower ends, which hook into holes in the plates M', attached to the outer standards K, so that the said outer standards K can be raised and lowered by raising and lowering the inner standards R; and so that the outer plows may be adjusted to work deeper or shallower in the ground than the inner plows, by adjusting the hooks L'.

Having thus described my invention, what I claim as new, and desire to secure by Letters Patent, is—

1. The plow-standards K R, connected by hooks L' and having side-keepers, combined with pivoted bars O, pivoted bars U having foot-rests E', bars B' N provided with keepers, and lever F', all arranged as described, and applied to the frame of a sulky-cultivator for the purpose set forth.

2. The band and set-screw C', in combination with the draft-bars O of the outer plow, standards K, and with the lower horizontal parts of the axle B, substantially as herein shown and described, and for the purpose set forth.

HUGH P. JORDAN.

Witnesses:
J. M. BROWNSON,
G. F. ROGERS.